(12) United States Patent
Sarkar et al.

(10) Patent No.: US 7,236,580 B1
(45) Date of Patent: Jun. 26, 2007

(54) METHOD AND SYSTEM FOR CONDUCTING A CONFERENCE CALL

(75) Inventors: Shantanu Sarkar, San Jose, CA (US); Labhesh Patel, Mountain View, CA (US); Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 825 days.

(21) Appl. No.: 10/081,608

(22) Filed: Feb. 20, 2002

(51) Int. Cl.
*H04M 3/42* (2006.01)
*H04M 11/00* (2006.01)
*G10L 15/00* (2006.01)

(52) U.S. Cl. .............. 379/202.01; 379/93.23; 704/235

(58) Field of Classification Search .......... 379/202.01, 379/93.23; 370/260; 709/206; 704/235, 704/270
See application file for complete search history.

(56) References Cited

U.S. PATENT DOCUMENTS

| | | | | |
|---|---|---|---|---|
| 6,457,045 B1* | 9/2002 | Hanson et al. | .............. | 709/206 |
| 6,477,491 B1* | 11/2002 | Chandler et al. | ........... | 704/235 |
| 6,501,739 B1* | 12/2002 | Cohen | ........................ | 370/260 |
| 6,763,095 B1* | 7/2004 | Cermak et al. | .......... | 379/93.23 |
| 6,816,468 B1* | 11/2004 | Cruickshank | ................ | 370/260 |
| 6,996,531 B2* | 2/2006 | Korall et al. | ................ | 704/270 |
| 7,027,986 B2* | 4/2006 | Caldwell et al. | ............ | 704/235 |
| 2003/0163310 A1* | 8/2003 | Caldwell et al. | ............ | 704/235 |
| 2006/0106602 A1* | 5/2006 | Caldwell et al. | ............ | 704/235 |

FOREIGN PATENT DOCUMENTS

| | | |
|---|---|---|
| EP | 0 664 636 A2 | 10/1994 |
| EP | 0 835 015 A2 | 9/1997 |
| EP | 0 978 981 A2 | 7/1999 |
| JP | 10136327 A * | 5/1998 |

OTHER PUBLICATIONS

PCT Notification of Transmittal of the International Search Report or the Declaration, mailed Jun. 11, 2003, including International Search Report re PCT/US 03/04042 (7 pgs).

* cited by examiner

*Primary Examiner*—Bing Q. Bui
*Assistant Examiner*—Thjuan P. Knowlin
(74) *Attorney, Agent, or Firm*—Baker Botts L.L.P.

(57) ABSTRACT

According to one embodiment of the invention, a method for conducting a conference call between two or more participants is provided. The method includes receiving an indication of a request for text from a participant. The method also includes converting, in response to the indication, any speech of the other participants of the conference call into text. The method also includes sending the text to a device associated with the participant who requested test. The device is operable to display the text.

49 Claims, 3 Drawing Sheets

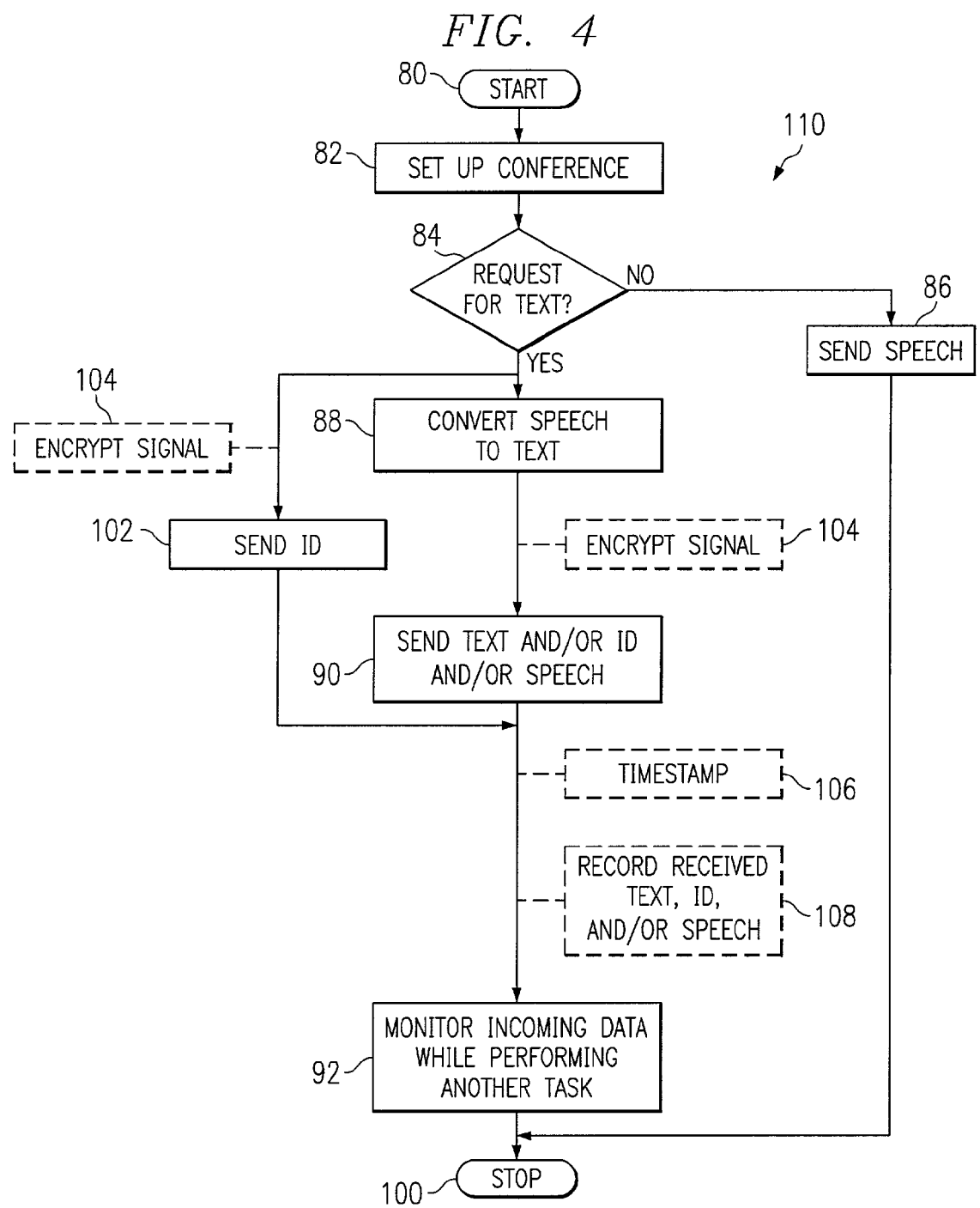

METHOD AND SYSTEM FOR CONDUCTING A CONFERENCE CALL

TECHNICAL FIELD OF THE INVENTION

This invention relates generally to communications and more particularly to a method and a system for conducting a conference call.

BACKGROUND OF THE INVENTION

Modern business practices often require that several persons meet on the telephone to engage in a conference call. The conference call has introduced certain applications and techniques that are superior to those found in a meeting with persons physically present in the same location. For example, a conference call participant who is not actively participating at the moment may wish to mute the audio output and simply listen to the conference call. This flexibility allows the particular participant to selectively participate in the conference call while attending to another matter, such as conversing with another party.

However, significant obstacles still remain in aurally monitoring a conference call while performing a secondary task, especially those tasks involving listening or speaking. For example, the participant muting the audio output and listening to the conference call may experience difficulty in conversing with a second party or listening to the conference call.

SUMMARY OF THE INVENTION

According to one embodiment of the invention, a method for conducting a conference call between two or more participants is provided. The method includes receiving an indication of a request for text from a participant. The method also includes converting, in response to the indication, any speech of the other participants of the conference call into text. The method also includes sending the text to a device associated with the participant who requested test. The device is operable to display the text.

Some embodiments of the invention provide numerous technical advantages. Some embodiments may benefit from some, none, or all of these advantages. For example, according to one embodiment, a passive participant is provided with the text of a conference call, allowing the passive participant to visually monitor the conference call while performing a second task. Such an alternative allows the passive participant to monitor the conference call by reading while conversing with a second party, rather than being forced to listen to multiple parties and attempting to respond appropriately. According to another embodiment, the passive participant is provided with the identity of the speaker, thus allowing selective participation by the passive participant while performing a second task. The ability to selectively participate in a conference call allows the passive participant to pay more attention to other tasks, increasing productivity of the passive participant.

Other technical advantages may be readily ascertained by one of skill in the art.

BRIEF DESCRIPTION OF THE DRAWINGS

Reference is now made to the following description taken in conjunction with the accompanying drawings, wherein like reference numbers represent like parts, in which:

FIG. 4 is a flow chart illustrating a method for conducting a conference call utilizing the system of FIG. 2 in accordance with one embodiment of the present invention.

DETAILED DESCRIPTION OF EXAMPLE EMBODIMENTS OF THE INVENTION

Embodiments of the invention are best understood by referring to FIGS. 1 through 4 of the drawings, like numerals being used for like and corresponding parts of the various drawings.

Figure 1:
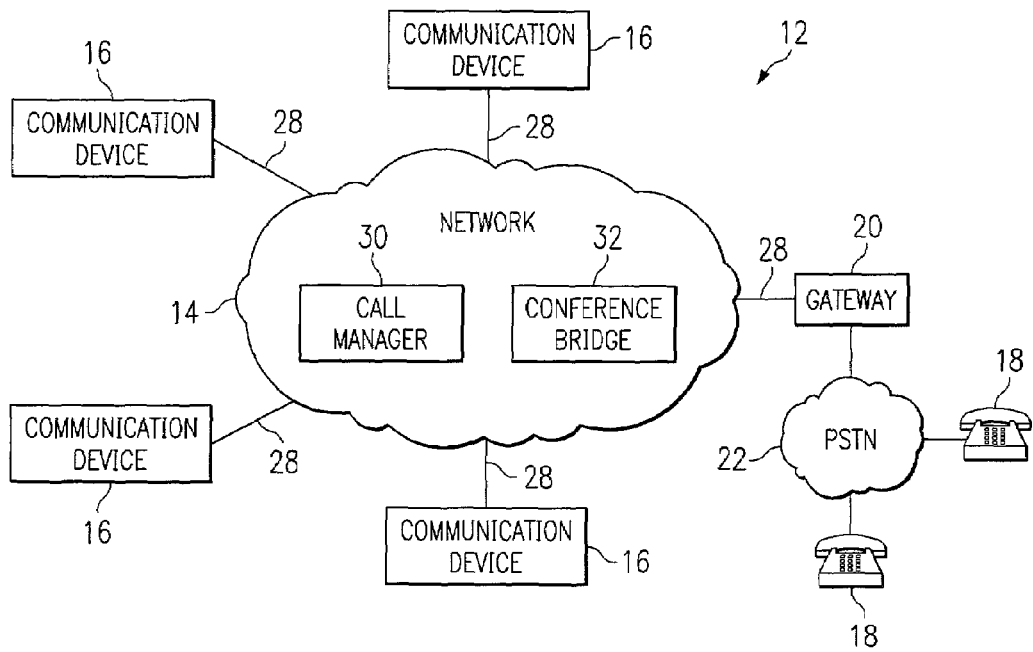
FIG. 1 is a schematic diagram illustrating a communication network that may benefit from the teachings of the present invention.

FIG. 1 illustrates a communications system 12 that may benefit from the teachings of the present invention. In this embodiment, communications system 12 is a distributed system transmitting audio, video, voice, data and other suitable types of real-time and non real-time traffic between source and destination endpoints; however, other communication systems that transmit any form of traffic may also benefit from the teachings of the invention. Communications system 12 includes a plurality of communication devices 16 attached to a network 14 and a plurality of analog telephones 18 attached to network 14 through a gateway 20 and a public switched telephone network ("PSTN") 22. Communication devices 16, analog telephones 18 and gateway 20 are connected to network 14 and/or PSTN 22 through twisted pair, cable, fiber optic, radio frequency, infrared, microwave, or any other suitable type or combination of wireline or wireless links 28.

In one embodiment, network 14 is the Internet, a wide area network ("WAN"), a local area network ("LAN") or other suitable network. In the Internet embodiment, network 14 transmits information in Internet Protocol ("IP") packets. Telephony voice information is transmitted in the Voice over IP ("VoIP") format. Real-time IP packets such as VoIP packets are encapsulated in real-time transport protocol ("RTP") packets for transmission over network 14. Network 14 may comprise any other suitable type of elements and links over which traffic may be otherwise suitably transmitted using other protocols and formats.

Communication device 16 comprises IP or other digital telephones such as an IP telephone 16A (shown in FIG. 2, discussed below), personal and other suitable computers or computing devices such as a personal computer 16B (shown in FIG. 2, discussed below), electronic personal organizers such as personal digital assistants ("PDAs"), or other suitable types of communication devices. Communication device 16 may also comprise cell or other mobile telephones or handset or any other suitable communication device or set of devices, an example of which is analog telephone 18 and gateway 20 combination, capable of communicating real-time audio, video and/or other information and engaging in a conference with other devices or set of devices over network 14. Communication device 16 may also include a screen for displaying text messages, such as an IP display 16C (shown in FIG. 2, discussed below). In addition to communicating substantive information, communication device 16 communicates control information with network 14 to control call setup, teardown, and processing as well as call services.

For voice calls, communication device 16 comprises one or more real-time applications that play traffic as it is received or substantially as it is received. A coder/decoder ("codec") (not explicitly shown) may be utilized to convert audio, video or other signals generated by users, such as from a user speaking into a phone, from analog signals into digital form. The digitally encoded data is encapsulated into IP or other suitable packets for transmission over network 14. IP packets received from network 14 are converted back into analog signals and played to the user. Communication device 16 may otherwise suitably encode, decode, compress and decompress signals transmitted over or received from network 14.

Gateway 20 provides conversion between analog and/or digital formats. Analog telephones 18 communicate standard telephony signals through PSTN 22 to gateway 20. At gateway 20, standard telephony signals are converted to IP packets in the VoIP format. Similarly, VoIP packets received from network 14 are converted into standard telephony signals for delivery to analog telephone 18 through PSTN 22. Gateway 20 also translates between the IP network call control system and ISDN, T1, CAS, and other signaling protocols used in PSTN 22.

In one embodiment, call manager 30 and a conference bridge 32 are attached to network 14. Call manager 30 and conference bridge 32 may be located in a central facility or have their functionality distributed across network 14 or its periphery. Call manager 30 and conference bridge 32 are coupled to network 14 by any suitable type of wireline or wireless link 28. In another embodiment, network 14 may be operated without call manager 30, in which case communication devices 16 may communicate control information directly with each other or with other suitable network elements. In this embodiment, services are provided by communication devices 16 and/or other suitable network elements.

Call manager 30 manages calls in network 14. A call is any communication session between two or more endpoints. The endpoints may be persons and/or equipment such as telephones or computers. The sessions may include real-time connections, connections having real-time characteristics, non real-time connections and/or a combination of connection types.

Call manager 30 is responsive to service requests from communication devices 16, including analog telephone 18 through gateway 20. For example, call manager 30 may provide voicemail, bridging, multicasting, call hold, conference call and other multiparty communications and/or other suitable services for communications device 16. Call manager 30 provides services by actually performing the services, controlling performance of the services, delegating performance of the services, and/or by otherwise initiating the services.

Conference bridge 32 provides conference call and other suitable audio, video, and/or real-time multiparty communication sessions between communication devices 16. A multiparty communication session includes two or more parties exchanging audio and/or other suitable information. In particular, conference bridge 32 receives media from participating communication devices 16 and, using suitable signal processing techniques, mixes media from each participating communication device 16 to produce conference output streams. During normal operation, each communication device 16 receives a conference output stream that includes contributions from all other participating communication devices 16.

In operation, in one embodiment, a call initiation request is first sent to call manager 30 when a call is placed over network 14. For example, the call initiation request may be generated by communication device 16 and/or gateway 20 for analog telephones 18. Once call manager 30 receives the call initiation request, call manager 30 sends a control signal to the initiating communication device 16, and/or gateway 20, for analog telephones 18 offering to call the destination device. If the destination device can accept the call, the destination device replies to call manager 30 that it will accept the call. By receiving this acceptance, call manager 30 transmits a signal to the destination device causing it to ring. When the call is answered, call manager 30 instructs the called device and the originating device to begin media streaming to each other. If the originating device is analog telephone 18, the media streaming occurs between gateway 20 and the destination device. Gateway 20 then transmits the media to analog telephone 18.

For conference calls, in one embodiment, call manager 30 identifies participants based on the called number or other suitable criteria. A participant is any party involved with the conference call. In one embodiment, call manager 30 controls conference bridge 32 to set up, process, and tear down conference calls and other multiparty communication sessions. In another embodiment, conference bridge 32 sets up, processes, and tears down conference calls and other multiparty communication sessions. During the multiparty communications sessions, participants are connected to, and stream media through, conference bridge 32. In one embodiment, the media is mixed to produce conference output streams to be transmitted to each participant. The conference output stream for a participant includes the media of all other participants, a subset of other participants or other suitable mix dictated by the type of multiparty session, and/or the participant.

Any participant in a conventional conference call involving audio communication over a network such as network 14 has an option to be a passive participant of the conference call. A passive participant is any participant who wishes to partially or wholly refrain from providing input to the conference call. Reasons for exercising such an option may be for answering another call, conversing with a colleague, watching the news, or any other tasks that may be performed while monitoring the conference call. There are many ways to passively participate in the conference call. For instance, the passive participant may mute his/her audio output and simply listen to the conference call. The passive participant may also place the conference call on hold. The flexibility of monitoring the conference call while attending to another matter increases the productivity of the passive participant. However, certain tasks are difficult to perform simultaneously with aurally monitoring the conference call. For instance, a passive participant who is aurally monitoring the conference call may find it difficult to engage in a second conversation with another party because listening to two different parties creates confusion and comprehension gaps. In such a case, the quality of either aurally monitoring the conference call, the second conversation, or both, may suffer.

According to the teachings of the invention, a method and system for conducting a conference call includes providing a substantially real-time text stream of the conference call to a passive participant. This is advantageous because the passive participant may find it easier to visually, rather than aurally, monitor the conference call while performing another task. Such text may be provided in addition to, or instead of, an audio signal. According to another embodiment of the invention, such text may be provided to a participant who is also actively participating in the conference call. Additional details of example embodiments of the system and method are described in greater detail below in conjunction with FIGS. 2 through 4.

Figure 2:
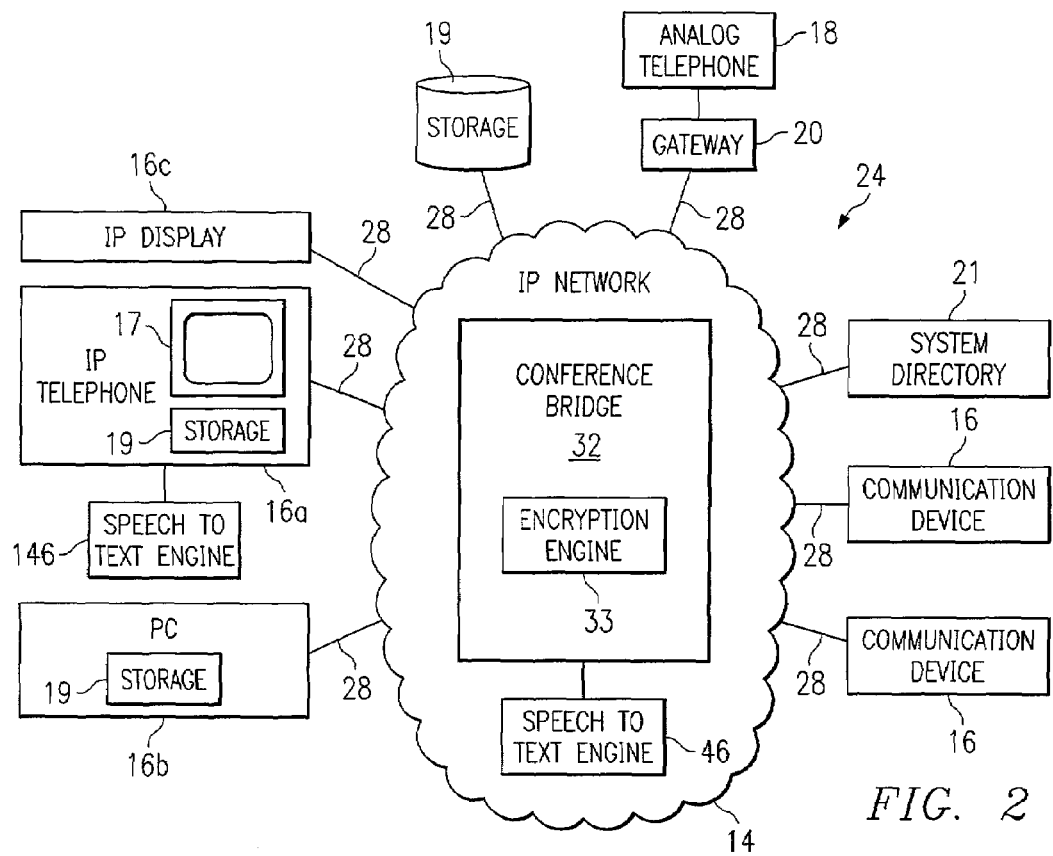
FIG. 2 is a schematic diagram illustrating portions of the communication network of FIG. 1, including a system for conducting a conference call in accordance with one embodiment of the present invention.

FIG. 2 is a schematic diagram illustrating portions of the communication network of FIG. 1, including a system for conducting a conference call in accordance with one embodiment of the present invention. Conference bridge 32 facilitates communication between communication devices 16 participating in the conference call over IP network 14. An example of conference bridge 32 is available from Cisco Systems under the name of "Cisco Conference Connection." Conference bridge 32 is coupled to a speech-to-text engine 46. Examples of speech-to-text engine 46 are available from IBM and Microsoft. Alternatively, an Adaptive Speech Recognition System, which generally provides more limited grammar capabilities than a speech-to-text engine may be used, as well as any other suitable device that converts speech into text either existing now, or yet to be developed. One example of an Adaptive Speech Recognition System is available from Nuance. Speech-to-text engine 46 can be an integral part of conference bridge 32 or a separate component that is separate from conference bridge 32. Communication devices 16 are linked to conference bridge 32 through links 28 and the IP network 14. Speech of participants transmitted by communication devices 16 are sent through links 28 to conference bridge 32 over IP network 14. Conference bridge 32 appropriately converts and mixes the speech from each communication device 16 and sends the resulting conference output streams to each communication device 16. Resources within speech-to-text engine 46 may be reserved at the same time as conference bridge 32, or at other suitable times.

When a participant wishes to passively participate in the conference call, or otherwise wishes to receive text, the participant transmits an indication of a request for text. The participant may make such a request by, for example, pressing a "hold" button or "mute" button or other suitable button on communication device 16. Alternatively, such a request may be made through a suitable "soft button," or through other suitable techniques. In one example, "Information Elements" (IE) are transmitted that are indicative of the request for text. The indication of a request for text may be transmitted from communication device 16 when communication device 16 is suppressing outgoing speech, or when the user associated with communication simply wishes to see text, with or without receiving audio. In response to receiving the information element indicative of a request for text, conference bridge 32 sends the speech from communication devices 16 to speech-to-text engine 46. Speech-to-text engine 46 converts speech into a text representation and sends the text back to conference bridge 32. In turn, conference bridge 32 sends the text to communication device 16 that transmitted the request for text. Additional details regarding conference bridge 32 and speech-to-text engine 33 are provided below in conjunction with FIG. 3. In other embodiments, communication devices 16 may send audio directly to speech-to-text engine 46, by-passing conference bridge 32.

In an alternative embodiment, IP telephone 16a receives an indication of a request for text, as described above, but instead of transmitting such indication to conference bridge 32, directly transmits any speech received from the conference bridge 32 to an associated speech-to-text engine specifically associated with IP telephone 17, such as speech-to-text engine 146. Speech-to-text engine 146 then converts the received speech to text and provides text back to IP telephone 16a. In this manner, speech may be converted to text without requiring a conference bridge to maintain the necessary functionality to know which participants are requesting text.

In one embodiment, the passive participant may use IP telephone 16A that has a text display screen 17. When the passive participant causes IP telephone 16A to invoke the receipt-of-text feature, conference bridge 32 transmits the text of the conference call to IP telephone 16A. In turn, IP telephone 16A displays the text onto text display screen 17. The participant requesting text may monitor the conference call by reading the text displayed by text display screen 17 while engaging in another conversation. In the example in which the participant requesting text is a passive participant, when the passive participant wishes to resume active participation in the conference call, the passive participant can invoke a halt-text feature by requesting IP telephone 16A to transmit to conference bridge 32 an indication of a request to halt receipt of the text. In one example, such a request may be initiated by disengaging a "mute" or "hold" button on the participant's communication device 16. In response to the indication of a request to halt receipt of text, conference bridge 32 resumes transmission of the conference output stream to communication device 16 that initiated the request and halts transmission of associated text, in an embodiment in which incoming speech is suppressed. Alternatively, in an embodiment in which incoming speech is not suppressed, the request to halt receipt of text simply halts receipt of text.

In one embodiment, conference bridge 32 may transmit the identity of each speaking participant of the conference call. In another embodiment, conference bridge 32 may transmit the conference output stream, the text, and the identity of the participant associated with the text to IP telephone 16A. The conference output stream, the text, and/or the identity of the participant, each by itself or in any combination, may be transmitted by conference bridge 32 to any communication device 16 depending on the expressed needs of the passive participant. In another embodiment, the passive participant may receive an alert when a specific one of the other participants is speaking. In another embodiment, conference bridge 32 may generate a timestamp to accompany the text, where the timestamp associates the text to the speech and/or the conference output stream of each participant. For example, the timestamp may include the time when conference bridge 32 received the speech of each participant. One skilled in the art will be able to ascertain different ways to associate the text to the speech and or the conference output stream of each participant. In another embodiment, IP telephone 16A may record the text, the identity of the speaker, the timestamp, and/or conference output voice stream using a storage media 19 coupled to IP telephone 16A. Storage 19 may also be attached to network 14 rather than associated with a specific phone.

In one embodiment, the passive participant, or participant otherwise requesting text, using analog telephone 18 through gateway 20 to engage in the conference call may also incorporate personal computer 16B to monitor the conference call. Personal computer 16B may be either coupled to analog telephone 18 or located near analog telephone 18 so that the participant can monitor the conference call through personal computer 16 and access, depending on the needs of the participant, analog telephone 18 to actively participate in the conference call. Upon transmitting the feature invocation to conference bridge 32 by using either analog telephone 18 or personal computer 16B, conference bridge 32 may respond by transmitting the text, the identity of each speaking participant, the conference output stream, and/or a timestamp to personal computer 16B, each on its own or in any combination, depending on the expressed needs of the participant.

In one embodiment, the passive participant, or participant otherwise requesting text, can choose to record the text and/or timestamp and/or the identity and/or the conference output stream using storage medium 19 coupled to personal computer 16B or attached to network 14. In another embodiment, storage medium 19 of IP telephone 16A may be used to record the same. In yet another embodiment, storage may occur at a central site. Analog telephone 18 and personal computer 16B may be used in combination to offer the participant the same options as IP telephone 16A. For example, analog telephone 18 may be used to actively participate in the conference call while personal computer 16B is used to record incoming data and monitor the conference call. Upon transmitting the request to conference bridge 32 indicating that the participant wishes to halt receipt of text in the conference call, analog telephone 18 again receives the conference output stream from conference bridge 32 through gateway 20. In the case of a passive participant, such a request may be effected through disengaging a "mute" or "hold" button on communication device 16, or other suitable button associated with the passive participant. As described above, in one embodiment a user may receive both voice and text at the same time, with no voice packets being suppressed.

In one embodiment, IP display 16C may receive the identities of speaking participants of the conference call. Monitoring the identities of the speaking participants on IP display 16C allows passive participant, or participant otherwise receiving text, to selectively participate in the conference call using communication device 16 when a particular speaker starts to contribute to the conference call. IP display 16C may be used in conjunction with IP telephone 16A, analog telephone 18, or other communication devices to allow the participant to monitor the identity of the speaking participants. IP display 16C may also display the text sent by conference bridge 32.

In one embodiment, IP display 16c is associated with IP telephone 17 through a system directory 21. System directory 21 may include access information conventionally used for authentication purposes in a network, but in this embodiment includes information associating IP display 16c with IP telephone 16a. In this manner, whenever data is intended to be sent to IP telephone 16a, conference bridge 32 knows to instead send the data to IP display 16c. IP display 16c and IP telephone 16a have different IP addresses in this embodiment. This association may occur in response to an indication by a user to select IP display 16c to receive text or may be performed automatically by conference bridge 32 in response to determining that an IP phone does not have an associated display. Conference bridge 32 may also request from IP telephone 16a an alternative screen to which to send text if it determines that IP phone 16a does not have an associated display.

In one embodiment, conference bridge 32 may encrypt any outgoing data using an encryption engine 33. Encryption engine 33 may be integral to or separate from conference bridge 32.

System 24 offers the technical advantage of providing alternate ways to monitor a conference call while performing other tasks. Depending on the nature of the alternate task, a passive participant may choose to monitor the conference call by reading the text, the identity of the speakers, listening to the speakers while receiving text, or recording all incoming data to be reviewed later, or in any combination thereof. For example, if the alternate task is engaging in a conversation with another party, the passive participant may choose to monitor the conference call by reading the text of the conference call and listening to the corresponding conference output stream at a lower volume.

Figure 3:
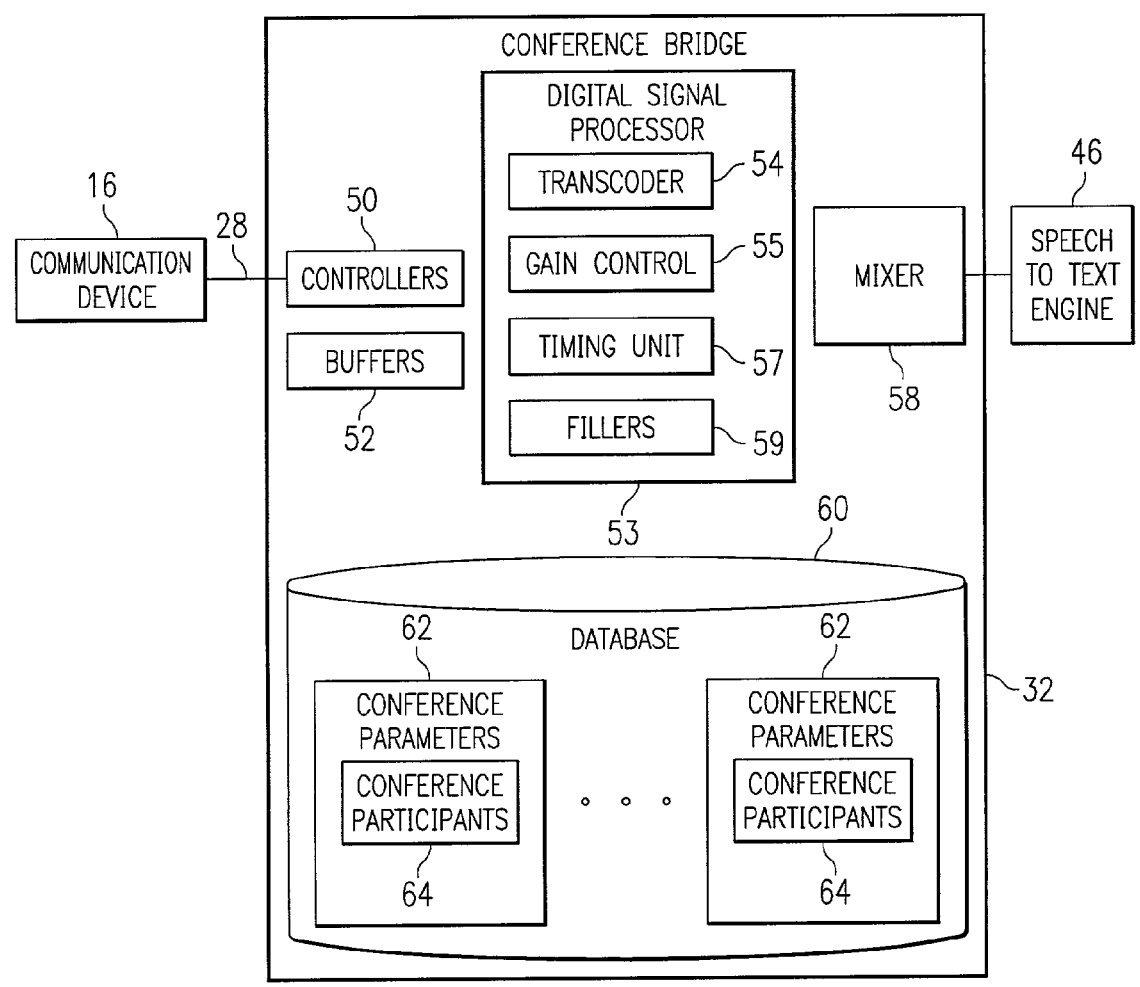
FIG. 3 is a schematic diagram illustrating the conference bridge and a speech-to-text engine of FIG. 2 in accordance with one embodiment of the present invention.

FIG. 3 illustrates details of conference bridge 32 in accordance with one embodiment of the present invention. In this embodiment, conference bridge 32 is coupled to a speech-to-text engine 46. Conference bridge 32 provides real-time multiparty audio connections between two or more participants. Conference bridge 32 may support other types of suitable multiparty communications sessions including real-time video streams without departing from the scope of the present invention.

Conference bridge 32 includes a controller 50, buffers 52, a digital signal processor 53 including transcoders 54, a gain control unit 55, a timing unit 57, and filters 59, a mixer 58 and a database 60. Controller 50, transcoders 54, gain control unit 55, timing units 57, filters 59, and mixer 58 of conference bridge 32, as well as other suitable components of the communications system 12, may comprise logic encoded in media. Logic comprises functional instructions for carrying out programmed tasks. The media may comprise computer disks or other suitable computer-readable media, applications specific integrated circuits (ASIC), field programmable gate arrays (FPGA) or other suitable specific or general purpose processors, transmission media, or other suitable media in which logic may be encoded and utilized. In this example, transcoders 54, gain control 55, timing unit 57, and filters 59 are implemented by digital signal processor 53.

Buffers 52 include input and output buffers. The input buffers receive and buffer packets of input audio streams from communication devices 16 for processing by conference bridge 32. The output buffers receive and buffer conference output streams and/or the text form of conference output streams (text) generated by the conference bridge 32 and/or speech-to-text engine 46 for transmissions to communication devices 16, including devices such as IP telephone 16A, personal computer 16B, and IP display 16C.

Transcoders 54 within digital signal processor 53 include input and output transcoders. The input transcoders 54 receive input audio stream from a corresponding buffer 52 and transcodes the audio stream from a compressed format of communication device 16 to an uncompressed format of the conference bridge 32 for mixing and processing in conference bridge 32 or in speech-to-text engine 46. In one example, the uncompressed format refers to the G.711 format, representing raw, uncompressed voice or data, and the compressed format refers to the G.729 format, representing compressed voice. Conversely, transcoders 54 receive conference output streams of the conference output streams in an uncompressed format and transcode the conference output streams into a compressed format of each participant's communication device 16 and passive participant's communication devices 16. In this way, conference bridge 32 allows participants to engage in the conference call using a variety of devices and technologies.

Gain control 55 provides gain control for various components of conference bridge 32. Timing unit 57 controls timing associated with various components of conference bridge 32. Filters 59 provide filtering capability for conference bridge 32. Each of these components is implemented, in this example, by digital signal processor 53, as shown.

Mixer 58 includes a plurality of summers or other suitable signal processing resources each operable to sum, add or otherwise combine a plurality of input audio streams into conference output streams for communication devices 16 engaged in the conference call. Once mixer 58 has generated the conference output stream, the conference output stream may be routed to speech-to-text engine 33 depending on whether an indication for a request for text was received from a participant. The conference output streams are transcoded by a corresponding transcoder 54 and buffered by a corresponding output buffer 52 for transmission to the corresponding communication device 16.

Database 60 includes a set of conference parameters 62 for each ongoing conference call of the conference bridge 32. Conference parameters 62 for each conference call include an identification of participants 64 of the conference call. In one embodiment, the participants of corresponding communication devices 16 are identified at the beginning of a conference call based on caller ID, phone number, IP address, or other suitable identifier. Each packet of incoming media stream may directly or indirectly identify the associated participant, or other suitable indication of the identify of the participant may be provided. In one embodiment, each set of packets from each communication device 16 may contain the IP address of the participant associated with the particular communication device 16. In turn, conference bridge 32 may send out an indication of the identity of a particular participant, with or without that participant's speech or the text version of the speech, to passive participants, or participants otherwise requesting text.

Controller 50 directs the other components of conference bridge 32 and, in one embodiment, communicates with call manager 30 to set up, process and tear down conference calls. Controller 50 may also receive an indication of a desire to receive text, either directly from the communication devices 16 or through call manager 30. Such indications may be received from the participants in-band with the audio stream or out-of-band over a control link or channel.

In response to the indication of a desire to receive text, controller 50 directs mixer 58 to send a combination of all incoming streams to mixer 58 to speech-to-text engine 46. Upon receiving the combination of incoming streams, speech-to-text engine 46 converts the conference output streams into text. After the conversion, speech-to-text engine 46 sends the text back to conference bridge 32. Conference bridge 32, using the appropriate transcoder 54 and/or buffer 52 then sends the text to communication device 16 that initiated the request for text. In one embodiment, conference bridge 32 sends the conference output voice stream along with the outgoing text. In another embodiment, conference bridge 32 transmits the identity 64 of each participant stored in database 60. In another embodiment, conference bridge 32 transmits the identity 64 of each participant responsible for the particular speech and/or text along with the text and/or conference output streams. In another embodiment, conference bridge 32 may generate a timestamp to couple to the text, where the timestamp facilitates associating the text with the speech. The text, speech, timestamp, and/or identity 64 may be provided by conference bridge 32 individually or in any combination depending on the needs of the passive participant. In another embodiment, all or parts of the media stream transmitted out of output buffer 52 may be encrypted using an encryption engine 33. In yet another embodiment endpoints 16 communicate directly with the speech to text engine.

FIG. 4 shows a flow chart of method 110 in accordance with one embodiment of the present invention. An embodiment of method 110 may be implemented by system 24 of FIG. 2, utilizing conference bridge 32 and speech-to-text engine 46 of FIG. 3, or by other systems. Method 110 starts at step 80. At step 82, a conference call is set up, with or without the use of call manager 30. Conference bridge 32 or call manager 30 may determine the identity 64 of each participant of the conference call. That determination may be made, for example, from an IP address of communication device 16. In another embodiment, users log on to the conference call and the identity of the users is authenticated at that time. At step 84, conference bridge 32 determines whether at least one communication device 16 is suppressing any outgoing signals at the direction of a passive participant or otherwise indicating a request for transcribed text. Conference bridge 32 can make that determination when communication device 16 of a participant triggers a request for text to be transmitted, indicating that the participant is requesting text with or without suppressing outgoing voice packets. A user may indicate such a desire to receive text, with or without suppressing outgoing voice packets, by a button on communication device 16, by a soft key, or through other suitable techniques such that transcribed text is sent to communication device 16.

If conference bridge 32 determines that no communication device 16 is suppressing any outgoing signal or that text has not otherwise been requested, then conference bridge 32 continues to send conference output streams to each communication device 16 at step 86. In one embodiment, if conference bridge 32 receives a request for text from one or more communication devices 16, then conference bridge 32 takes measures to convert speech from each communication device 16 into text at step 88. Once speech is converted to text, then conference engine 32 sends the text at step 90 to communication device 16 that had initiated the request for text. When the text is received at communication device 16, the participant receiving text monitors the text at step 92. The participant receiving text may monitor the text while performing another task. Method 110 concludes at step 100.

In one embodiment, conference bridge 32 may transmit only the identity 64 of each speaking participant at step 102, rather than the associated substantive text. The participant receiving text then monitors the identity 64 of each speaking participant at step 92 for selective participation in the conference call. In another embodiment, all or parts of the media stream that is transmitted from conference bridge 32 may be encrypted at step 104. For example, conference engine 33 can use an encryption engine 33 to encrypt the identity 64 at step 104 before sending the identity 64 at step 102. In another embodiment, encryption engine 33 can be used to encrypt the text and/or the conference output stream, and/or the identity 64 at step 104 before step 90 of sending the text and/or the conference output stream and/or the identity 64. In another embodiment, conference bridge 32 may generate a timestamp and couple it to outgoing text at step 106. Recording of either voice packets or transcribed text may occur through use of Network Attached Storage, which refers to a central storage site that is attached to the network; however, in some embodiments it may be beneficial to record such information locally, such as in storage media 19 of IP telephone 16A, which is illustrated as step 108.

Methods and systems described in detail above offer a solution to the difficulty of conducting a conference call while performing another task. One benefit from some embodiments of the invention is that a participant can choose a method of monitoring a conference call depending on the nature of the alternate task.

Although the present invention has been described in detail, it should be understood that various changes, substitutions, and alterations can be made hereto without departing from the spirit and scope of the invention as defined by the appended claims.

What is claimed is:

1. A method for conducting a conference call between two or more participants, comprising:
   receiving an indication of a request for text from a participant of the conference call who has previously received speech from another participant of the conference call;
   in response to the indication from the participant, converting any speech of the other participants of the conference call into text;
   sending the text to a device associated with the participant from which the indication of a request for text was received, the device operable to display the text; and
   wherein the indication of a request for text is received in response to a participant muting the call.

2. The method of claim 1, and further comprising encrypting the text.

3. The method of claim 1, and further comprising sending to the device the speech corresponding to the text.

4. The method of claim 3, wherein the text comprises a timestamp, the timestamp associating the text with the speech corresponding to the text.

5. The method of claim 1, and further comprising recording the text at the device.

6. The method of claim 1, wherein the indication of a request for text comprises an indication that a button is depressed on a telephone associated with the participant requesting text.

7. The method of claim 1, wherein the indication of a request for text comprises an indication that a soft key associated with the participant requesting text is depressed.

8. The method of claim 1, wherein the indication of a request for text comprises an indication that the participant requesting text is suppressing transmission of voice media packets to the participant requesting text.

9. The method of claim 1, wherein the indication of a request for text comprises an indication that the participant requesting text is suppressing transmission of voice media packets from the participant requesting text.

10. The method of claim 1, and further comprising converting any speech of the participant requesting text into text.

11. The method of claim 1, and further comprising alerting the participant requesting text that a specific one of the other participants is speaking.

12. A method for conducting a conference call with a plurality of participants, comprising:
    determining the identity of each participant providing input to the conference call;
    receiving an indication of a request for text from a participant of the conference call;
    in response to receiving the indication of a request for text from the participant, sending the identity of each other participant of the conference call, when the respective other participant is speaking, to a device associated with the participant from which the indication of a request for text was received, the device operable to display the identity of each participant; and
    wherein the indication of a request for text is received in response to a participant muting the call.

13. The method of claim 12, and further comprising converting, in response to the indication of a request for text, any speech of each other participant of the conference call into text and sending the text to the device, the text associated with the identity of each participant.

14. The method of claim 13, and further comprising encrypting the text.

15. The method of claim 13, and further comprising sending to the device the speech associated with the text.

16. The method of claim 15, wherein the text comprises a timestamp, the timestamp associating the text with the speech corresponding to the text.

17. The method of claim 16, and further comprising recording the text and the speech corresponding to the text at the device.

18. The method of claim 17, wherein recording the text and speech comprises recording the speech and text at the device.

19. The method of claim 17, wherein recording the text and speech comprises recording the speech and text within a central storage unit attached to the network.

20. The method of claim 12, wherein the indication of a request for text comprises an indication that a button is depressed on a telephone associated with the participant requesting text.

21. The method of claim 12, wherein the indication of a request for text comprises an indication that a soft key associated with the participant requesting text is depressed.

22. The method of claim 12, wherein the indication of a request for text comprises an indication that the participant requesting text is suppressing transmission of voice media packets to the participant requesting text.

23. The method of claim 12, wherein the indication of a request for text comprises an indication that the participant requesting text is suppressing transmission of voice media packets from the participant requesting text.

24. The method of claim 12, and further comprising sending the identity of the participant requesting text, when the participant requesting test is speaking, to the device.

25. A system for conducting a conference call with a plurality of participants, comprising:
    a conference bridge operable to receive an indication of a request for text from at least one of the participants who has previously received speech from another one of the plurality of participants during the conference call, and in response to the indication, send text that represents speech of one or more of the participants to the participant who requested text;
    a speech-to-text engine coupled to the conference bridge, the engine operable to convert the speech of the one or more participants into the text and send the text to the conference bridge; and
    wherein the indication of a request for text is received in response to a participant muting the call.

26. The system of claim 25, wherein the conference bridge is operable to determine an identity of each participant of the conference call and send the identity to the participant making the request for text, each identity associated with the corresponding text that represents the speech of each participant.

27. The system of claim 25, and further comprising an encryption engine coupled to the conference bridge.

28. The system of claim 25, wherein the conference bridge is operable to send the speech of each participant, with the text, to the participant who requested text.

29. The system of claim 28, wherein the conference bridge is operable to couple a timestamp with the text, then send the text to the participant who requested text, the timestamp associating the text with the speech corresponding to the text.

30. The system of claim 25, and further comprising a device associated with the participant, the device comprising a storage media.

31. The system of claim 30, wherein the device is a text display screen coupled to an Internet Protocol phone.

32. The system of claim 25, wherein the device is a computer.

33. The system of claim 25, wherein the indication of a request for text from at least one of the participants further indicates that the participant is suppressing transmission of voice media packets to the participant.

34. The system of claim 25, wherein the conference bridge and the speech-to-text engine are each operable to be responsive to a concurrent reservation request.

35. A system for conducting a conference call, comprising:
 a conference management means for receiving an indication of a request for text from at least one participant who has previously received speech from another one of the plurality of participants during the conference call, and in response to the indication, sending text that represents speech of each participant to the participant who requested text;
 a speech-to-text conversion means coupled to the conference bridge, the speech-to-text conversion means for converting the speech of each participant into the text and sending the text to the conference management means; and
 wherein the indication of a request for text is received in response to a participant muting the call.

36. The system of claim 33, and further comprising a means for associating an identity of each participant of the conference call with each participant's input to the conference call, and coupling the identity to the corresponding text, the means coupled to the conference management means.

37. The system of claim 33, and further comprising a communication means for listening to the speech, the communication means coupled to the display means.

38. The system of claim 33, wherein the conference management means is also for transmitting the speech to the communication means.

39. The system of claim 36, wherein the conference management means is also for coupling a timestamp with the text, then transmitting the text to the display means, the timestamp associating the text with the speech corresponding to the text.

40. The system of claim 37, and further comprising a storage means for recording the text and the speech, the storage means coupled to the communication means.

41. The system of claim 33, wherein the indication of a request for text from at least one of the participants further indicates that the participant is suppressing transmission of voice media packets to the participant.

42. A method for conducting a conference call between two or more participants, comprising:
 receiving, at a telephone, an indication of a request for text from a participant of the conference call using the telephone who has previously received speech from one of the other two or more participants of the conference call during the conference call;
 in response to the indication, automatically transmitting from the telephone to a speech-to-text engine any speech received at the phone;
 receiving at the telephone from the speech-to-text engine text indicative of the received speech; and
 wherein the indication of a request for text is received in response to a participant muting the call.

43. The method of claim 42, wherein the indication of a request for text comprises an indication that a button is depressed on a telephone associated with the participant requesting text.

44. The method of claim 42, wherein the indication of a request for text comprises an indication that a soft key associated with the participant requesting text is depressed.

45. A method for conducting a conference call between two or more participants, comprising:
 receiving an indication of a request for text from a participant of the conference call;
 in response to the indication from the participant, converting any speech of the other participants of the conference call into text;
 sending the text to a device associated with the participant from which the indication of a request for text was received, the device operable to display the text; and
 wherein the indication of a request for text is received in response to an action selected from the group consisting of a participant placing the conference call on hold and a participant muting the call.

46. A method for conducting a conference call between two or more participants, comprising:
 receiving, at a telephone, an indication of a request for text from a participant of the conference call using the telephone;
 in response to the indication, automatically transmitting from the telephone to a speech-to-text engine any speech received at the phone;
 receiving at the telephone from the speech-to-text engine text indicative of the received speech; and
 wherein the indication of a request for text is received in response to an action selected from the group consisting of a participant placing the conference call on hold and a participant muting the call.

47. A method for conducting a conference call between two or more participants, comprising:
 receiving an indication of a request for text from a participant of the conference call who has previously received speech from another participant of the conference call;
 in response to the indication from the participant, converting any speech of the other participants of the conference call into text;
 sending the text to a device associated with the participant from which the indication of a request for text was received, the device operable to display the text; and
 wherein the indication of a request for text is received in response to a participant placing the conference call on hold.

48. A method for conducting a conference call with a plurality of participants, comprising:
 determining the identity of each participant providing input to the conference call;
 receiving an indication of a request for text from a participant of the conference call;
 in response to receiving the indication of a request for text from the participant, sending the identity of each other participant of the conference call, when the respective other participant is speaking, to a device associated with the participant from which the indication of a request for text was received, the device operable to display the identity of each participant; and wherein the indication of a request for text is received in response to a participant placing the conference call on hold.

49. A method for conducting a conference call between two or more participants, comprising:
  receiving, at a telephone, an indication of a request for text from a participant of the conference call using the telephone who has previously received speech from one of the other two or more participants of the conference call during the conference call;
  in response to the indication, automatically transmitting from the telephone to a speech-to-text engine any speech received at the phone;
  receiving at the telephone from the speech-to-text engine text indicative of the received speech; and
  wherein the indication of a request for text is received in response to a participant placing the conference call on hold.

* * * * *